(12) United States Patent
Nakashio et al.

(10) Patent No.: US 12,394,436 B2
(45) Date of Patent: Aug. 19, 2025

(54) MAGNETIC RECORDING MEDIUM

(71) Applicant: Sony Corporation, Tokyo (JP)

(72) Inventors: Eiji Nakashio, Miyagi (JP); Futoshi Sasaki, Miyagi (JP); Yuuichi Masuzawa, Miyagi (JP); Masaru Terakawa, Miyagi (JP); Minoru Yamaga, Miyagi (JP); Yoichi Kanemaki, Miyagi (JP); Kazuya Hashimoto, Miyagi (JP); Tomoe Sato, Miyagi (JP); Nobuyuki Sasaki, Miyagi (JP)

(73) Assignee: Sony Corporation, Tokyo (JP)

( * ) Notice: Subject to any disclaimer, the term of this patent is extended or adjusted under 35 U.S.C. 154(b) by 718 days.

(21) Appl. No.: 15/565,050

(22) PCT Filed: Mar. 8, 2016

(86) PCT No.: PCT/JP2016/001263
§ 371 (c)(1),
(2) Date: Oct. 6, 2017

(87) PCT Pub. No.: WO2016/166931
PCT Pub. Date: Oct. 20, 2016

(65) Prior Publication Data
US 2018/0114541 A1 Apr. 26, 2018

(30) Foreign Application Priority Data
Apr. 13, 2015 (JP) .................................. 2015-081849

(51) Int. Cl.
*G11B 5/733* (2006.01)
*G11B 5/70* (2006.01)

(52) U.S. Cl.
CPC ............... *G11B 5/733* (2013.01); *G11B 5/70* (2013.01); *G11B 5/7334* (2019.05)

(58) Field of Classification Search
CPC ........... G11B 5/731; G11B 5/733; G11B 5/70
See application file for complete search history.

(56) References Cited

U.S. PATENT DOCUMENTS 5,324,571 A * 6/1994 Koyama ................ G11B 5/733
6,472,063 B1 * 10/2002 Watase ................ G11B 5/7022
428/336

(Continued)

FOREIGN PATENT DOCUMENTS

JP  2002-237023 A    8/2002
JP  2002237024 A  *  8/2002

(Continued)

OTHER PUBLICATIONS

Machine Translation of JP 2002-237023.*

(Continued)

*Primary Examiner* — Holly Rickman
*Assistant Examiner* — Lisa Chau
(74) *Attorney, Agent, or Firm* — K&L Gates LLP

(57) ABSTRACT

Provided is a magnetic recording medium including: a support body; a base layer containing carbon particle powder and metal-containing particle powder; and a recording layer. In a recording surface, a maximum indentation depth h is $85 \leq h \leq 140$, and a ratio d of a permanent strain to an elastic recovery (permanent strain/elastic recovery) is $0.95 \leq d \leq 1.25$.

22 Claims, 4 Drawing Sheets

(56) References Cited

U.S. PATENT DOCUMENTS

2004/0264025 A1* 12/2004 Ishiguro .................. G11B 5/584
2007/0009769 A1* 1/2007 Kanazawa ............. B26D 1/245
                                                                                                                                     428/845.5

FOREIGN PATENT DOCUMENTS

| JP | 2006260613 A | | 9/2006 | |
|---|---|---|---|---|
| JP | 2006-286704 A | | 10/2006 | |
| JP | 2008192239 A | | 8/2008 | |
| JP | 2009116921 A | | 5/2009 | |
| JP | 2009134838 A | | 6/2009 | |
| JP | 2009238326 A | * | 10/2009 | |
| JP | 6586995 B2 | | 10/2019 | |
| JP | 6760456 B2 | | 9/2020 | |
| JP | 6888724 B2 | | 6/2021 | |
| WO | WO-2014115836 A1 | * | 7/2014 | .......... C01G 53/006 |
| WO | WO-2015198514 A | | 12/2015 | |

OTHER PUBLICATIONS

International Search Report (with English translation) mailed May 31, 2016 in corresponding international application No. PCT/JP2016/001263 (4 pages).

Written Opinion mailed May 31, 2016 in corresponding international application No. PCT/JP2016/001263 (4 pages).

* cited by examiner

A

B

MAGNETIC RECORDING MEDIUM

CROSS-REFERENCE TO RELATED APPLICATIONS

The present application claims the benefit of International Application No. PCT/JP2016/001263, filed Mar. 8, 2016, which claims priority to Japanese Application No. 2015-081849, filed Apr. 13, 2015, the disclosures of which are incorporated herein by reference.

BACKGROUND

The present technology relates to a magnetic recording medium. More specifically, the present technology relates to a magnetic recording medium including a support body, a base layer, and a recording layer.

Thus far, as a magnetic recording medium, a coating-type magnetic recording medium formed by applying a coating material onto a nonmagnetic support body and performing drying has been known. Such a coating-type magnetic recording medium is widely used as high-density recording media such as data cartridges for backup.

In the coating-type magnetic recording medium, it is desired to improve running durability. For example, Patent Literature 1 proposes a magnetic recording medium that is excellent in running durability, suppresses the increase in error rate in low humidity environments, and is excellent in electromagnetic conversion characteristics. Further, the literature describes a technology in which the indentation hardness (DH) of the surface of a magnetic layer is found using a Berkovich indenter and the indentation hardness (DH) is made 25 to 80 Kg/mm$^2$ (245 to 785 MPa).

CITATION LIST

Patent Literature

Patent Literature 1: JP 2006-286074A

SUMMARY

Technical Problem

An object of the present technology is to provide a magnetic recording medium that can improve running durability in high humidity environments.

Solution to Problem

According to the present technology in order to achieve the above-mentioned object, there is provided a magnetic recording medium including: a support body; a base layer containing carbon particle powder and metal-containing particle powder; and a recording layer. In a recording surface, a maximum indentation depth h is 85≤h≤140, and a ratio d of a permanent strain to an elastic recovery (permanent strain/elastic recovery) is 0.95≤d≤1.25.

Advantageous Effects of Invention

As described above, according to the present technology, the running durability of a magnetic recording medium in high humidity environments can be improved.

DETAILED DESCRIPTION

Embodiments of the present technology are described in the following order.
1 Configuration of magnetic recording medium
2 Method for producing magnetic recording medium
3 Effects
4 Modification examples

1 Configuration of Magnetic Recording Medium

Figure 1:
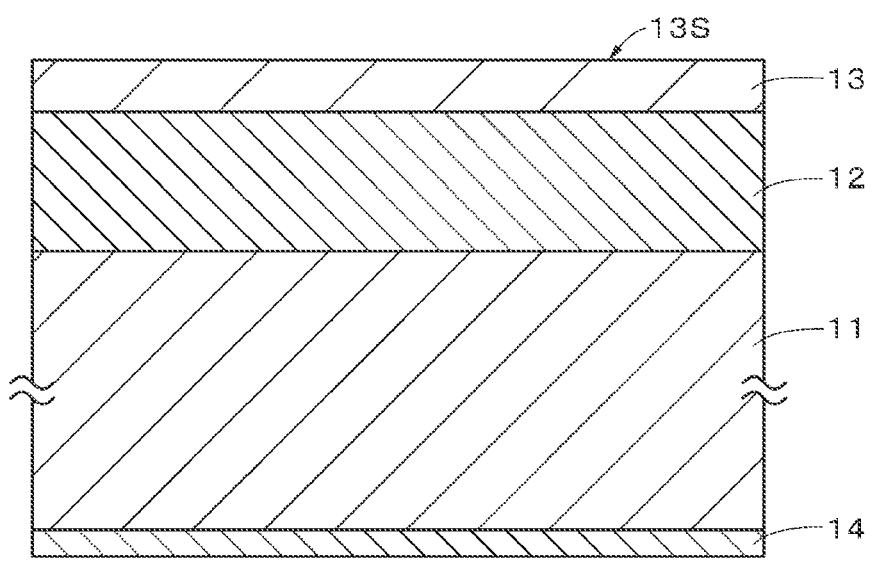
FIG. 1 is a schematic cross-sectional view showing an example of the configuration of a magnetic recording medium according to an embodiment of the present technology.

A magnetic recording medium according to an embodiment of the present technology is what is called a coating-type perpendicular magnetic recording medium; and as shown in FIG. 1, includes a nonmagnetic support body 11, a base layer 12 provided on one major surface of the nonmagnetic support body 11, and a recording layer 13 provided on the base layer 12. The magnetic recording medium may further include a back coat layer 14 provided on the other major surface of the nonmagnetic support body 11, as necessary. Further, the magnetic recording medium may further include a protection layer, a lubricant layer, etc. provided on the recording layer 13, as necessary. In the following, of both major surfaces of the magnetic recording medium, the major surface on the recording layer 13 side is referred to as a recording surface 13S.

The maximum indentation depth h of the recording surface 13S measured with a nanoindenter is 85≤h≤140, and the ratio d of the permanent strain to the elastic recovery (permanent strain/elastic recovery) of the recording surface 13S measured with a nanoindenter is 0.95≤d≤1.25. If the maximum indentation depth h and the ratio d of the permanent strain to the elastic recovery are in the ranges mentioned above, running durability in high humidity environments can be improved.

Figure 2:
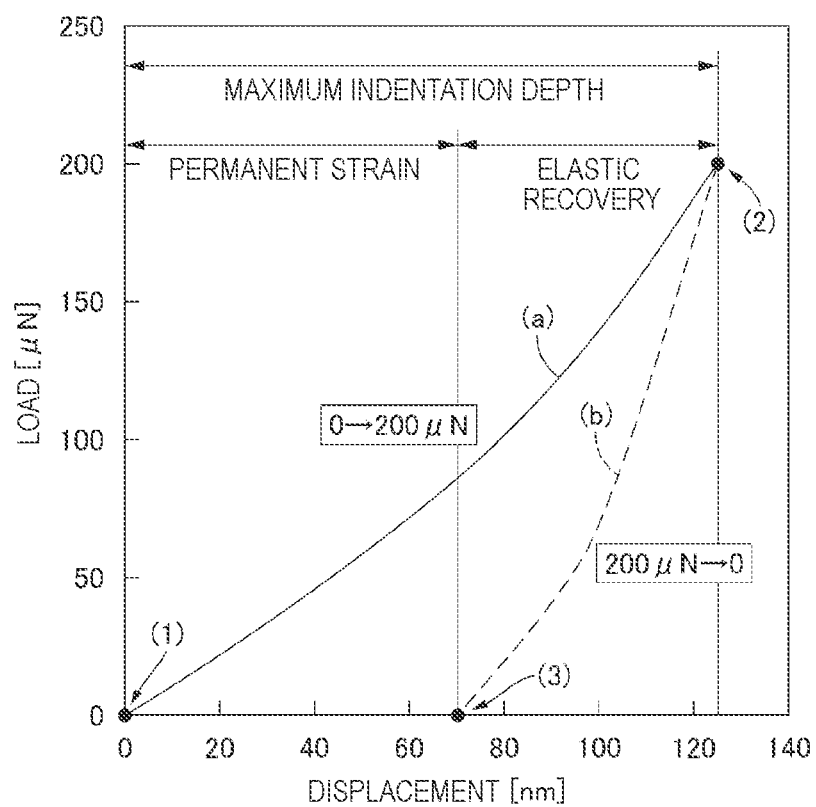
FIG. 2A is a graph for describing a measurement method with a nanoindenter.
FIG. 2B is a schematic diagram for describing the measurement method with a nano indenter.
Figure 2:
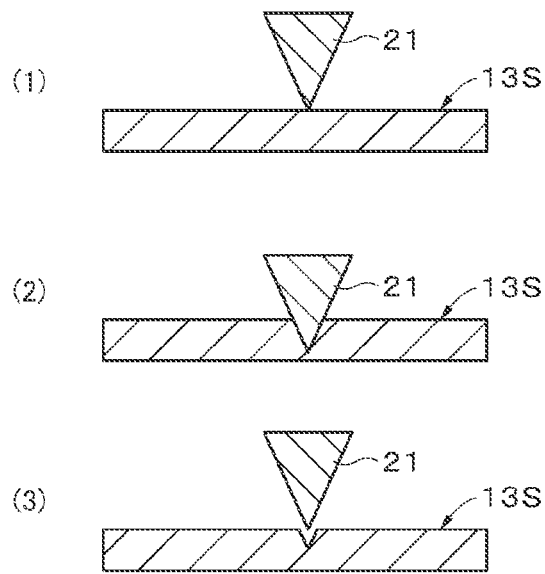

FIG. 2A is a loading-unloading curve showing the amount of displacement of an indenter in an event in which a load is continuously increased to push the indenter into the recording surface 13S of the magnetic recording medium and the load is removed at the time point when the load reaches 200 µN. States (1) to (3) shown in FIG. 2B show the states of an indenter 21 at points (1) to (3) shown in FIG. 2A, respectively.

If a load is applied, as shown in curve (a), the amount of displacement increases as the load increases, and exhibits the maximum indentation depth (the maximum amount of displacement) at 200 μN. If unloading is performed, as shown in curve (b), the amount of displacement decreases gradually and an elastic recovery occurs; but even if the load reaches zero, the amount of displacement does not become zero, and a permanent strain remains. Therefore, there is a relationship of "the maximum indentation depth" being equal to the sum of the "permanent strain" and the "elastic recovery."

(Nonmagnetic Support Body)

The nonmagnetic support body 11 is, for example, a strip-shaped film having flexibility. As the material of the nonmagnetic support body 11, for example, polyesters such as polyethylene terephthalate, polyolefins such as polyethylene and polypropylene, cellulose derivatives such as cellulose triacetate, cellulose diacetate, and cellulose butyrate, vinyl-based resins such as polyvinyl chloride and polyvinylidene chloride, plastics such as a polycarbonate, a polyimide, and a polyamide-imide, light metals such as an aluminum alloy and a titanium alloy, ceramics such as alumina glass, etc. may be used. Furthermore, to enhance the mechanical strength, a thin film containing an oxide of Al or Cu may be provided on at least one of the major surfaces of the nonmagnetic support body 11 containing a vinyl-based resin or the like.

(Base Layer)

The base layer 12 is a nonmagnetic layer containing nonmagnetic powder and a binder. The base layer 12 may further contain various additives such as electrically conductive particles, a lubricant, an abrasive, a hardener, and an antirust, as necessary.

The average thickness of the base layer 12 is preferably not less than 1000 nm and not more than 1300 nm, and more preferably not less than 1050 nm and not more than 1150 nm.

The average thickness of the base layer 12 is obtained in the following manner. First, the magnetic recording medium is cut out perpendicularly to its major surface, and a cross section of the piece is observed with a transmission electron microscope (TEM). Next, 10 points are randomly selected from the observed TEM image, and the thickness of the base layer 12 is measured at each point. Next, these measurement values are simply averaged (arithmetic mean), and the average thickness of the base layer 12 is found.

The measurement conditions of the TEM are shown in the following.

Apparatus: TEM (H-9000NAR, manufactured by Hitachi, Ltd.)
Accelerating voltage: 300 kV
Magnification: 100,000 times The nonmagnetic powder includes carbon particle powder and metal-containing particle powder. The carbon particle powder contains, for example, carbon black particles. The metal-containing particle powder contains, for example, one or more selected from the group consisting of metal particles, metal oxide particles, metal carbonate particles, metal sulfate particles, metal nitride particles, metal carbide particles, and metal sulfide particles. Specifically, the metal-containing particle powder contains, for example, one or more selected from the group consisting of silica particles, titanium oxide particles, alumina particles, iron oxide particles, and calcium carbonate particles. The nonmagnetic powder preferably contains iron oxide particles and carbon black particles. This is because dispersibility in the layer becomes good, an improvement in film quality can be achieved, and an improvement in surface smoothness can be achieved. The iron oxide particle is, for example, hematite (α-$Fe_2O_3$). The shape of the nonmagnetic powder may be, for example, various shapes such as a needle-like shape, a spherical shape, and a plate-like shape, but is not limited to these.

The volume ratio between the carbon particle powder A and the metal-containing particle powder B (A:B) in the base layer 12 is 73:27 to 83:17. Here, the range of the volume ratio mentioned above includes the numerical values of the upper limit value and the lower limit value. If the volume ratio of the carbon particle powder A is less than the range mentioned above, the recording surface 13S is too hard, and the maximum indentation depth h may be outside the range of 85≤h≤140. On the other hand, if the volume ratio of the carbon particle powder A is larger than the range mentioned above, the recording surface 13S is too soft, and the maximum indentation depth h may be outside the range of 85≤h≤140.

The area ratio between the carbon particle powder A and the metal-containing particle powder B (A:B) in the base layer 12 is 66:34 to 74:26. Here, the range of the area ratio mentioned above includes the numerical values of the upper limit value and the lower limit value. If the area ratio of the carbon particle powder A is less than the range mentioned above, the recording surface 13S is too hard, and the maximum indentation depth h may be outside the range of 85≤h≤140. On the other hand, if the area ratio of the carbon particle powder A is larger than the range mentioned above, the recording surface 13S is too soft, and the maximum indentation depth h may be outside the range of 85≤h≤140.

The area ratio between the carbon particle powder A and the metal-containing particle powder B (A:B) is found in the following manner. First, the magnetic recording medium is cut out perpendicularly to its major surface, and a cross section of the piece is observed with a TEM to acquire a TEM image.

The measurement conditions of the TEM are shown in the following.

Figure 3:
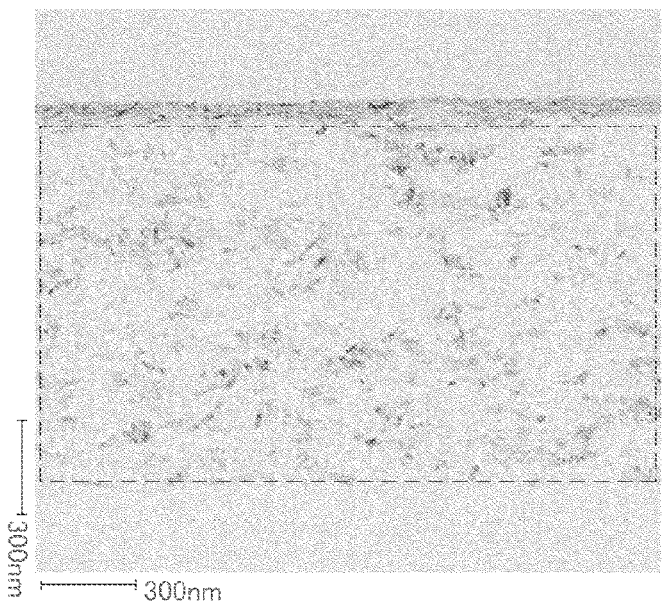
FIG. 3A is a cross-sectional TEM image for describing a method for finding the volume ratio between carbon particle powder and metal-containing particle powder.
FIG. 3B is a cross-sectional TEM image for describing the method for finding the volume ratio between carbon particle powder and metal-containing particle powder.
Figure 3:
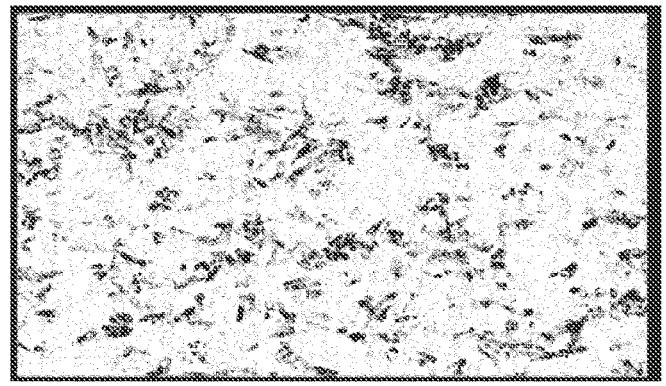

Apparatus: TEM (H-9000NAR, manufactured by Hitachi, Ltd.)
Accelerating voltage: 300 kV
Magnification: 100,000 times Next, using an image analysis software application for TEM (OLYMPUS Soft Imaging Solutions iTEM), the area ratio between the carbon particle powder A and the metal-containing particle powder B (A:B) is found from the TEM image in the following manner. First, as shown in FIG. 3A, a portion of the base layer 12 (in FIG. 3A, the area enclosed by the broken line) is cut out from the TEM image, and then the total area (the number of pixels) of the carbon particle powder A and the metal-containing particle powder B included in the cut out image is found. Next, while the cut out image is observed visually, the threshold value between the carbon particle powder A and the metal-containing particle powder B is set, and the image is expressed by 2 values as shown in FIG. 3B. Thus, an image of the metal-containing particle powder is extracted. Next, the area (the number of pixels) of the metal-containing particle powder B is found from the image expressed by 2 values. Next, "the area (the number of pixels) of the metal-containing particle powder B" is subtracted from "the total area (the number of pixels) of the carbon particle powder A and the metal-containing particle powder B" found in the above manner, and the area (the number of pixels) of the carbon particle powder A is found. Thus, the area ratio between the carbon particle powder A and the metal-containing particle powder B (A:B) is found.

The volume ratio between the carbon particle powder A and the metal-containing particle powder B (A:B) is found in the following manner. First, the area ratio between the carbon particle powder A and the metal-containing particle powder B (A:B) is found in the above manner. Next, assuming that the carbon particle powder A and the metal-containing particle powder B are in a spherical shape, the volume ratio between the carbon particle powder A and the metal-containing particle powder B (A:B) is found using the found area ratio (A:B). Specifically, the volume ratio (A:B) is found by the following formula.

$$V_A:V_B=(S_A)^{3/2}:(S_B)^{3/2}$$

where $S_A$: the area of the carbon particle powder A, $S_B$: the area of the metal-containing particle powder B, $V_A$: the volume of the carbon particle powder A, $V_B$: the volume of the metal-containing particle powder B As the binder, a resin of a structure in which a polyurethane-based resin, a vinyl chloride-based resin, or the like is subjected to a crosslinking reaction is preferable. However, the binder is not limited to these, and another resin may be blended in accordance with the properties required of the magnetic recording medium etc., as appropriate. The resin to be blended is not particularly limited as long as it is a resin usually and generally used in a coating-type magnetic recording medium.

Examples include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, a vinyl chloride-acrylonitrile copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, cellulose derivatives (cellulose acetate butyrate, cellulose diacetate, cellulose triacetate, cellulose propionate, and nitrocellulose), a styrene-butadiene copolymer, a polyester resin, an amino resin, synthetic rubber, and the like.

Further, examples of the thermosetting resin or the reactive resin include a phenolic resin, an epoxy resin, a urea resin, a melamine resin, an alkyd resin, a silicone resin, a polyamine resin, a urea formaldehyde resin, and the like.

Further, in each of the binders described above, a polar functional group such as $-SO_3M$, $-OSO_3M$, $-COOM$, or $P=O(OM)_2$ may be introduced for the purpose of improving the dispersibility of the magnetic powder. Here, in the formula, M is a hydrogen atom or an alkali metal such as lithium, potassium, or sodium.

Furthermore, as the polar functional group, a side chain-type group having an end group of $-NR1R2$ or $-NR1R2R3^+X^-$ or a main chain-type group of $>NR1R2^+X^-$ is given. Here, in the formulae, R1, R2, and R3 are a hydrogen atom or a hydrocarbon group, and $X^-$ is an ion of a halogen element such as fluorine, chlorine, bromine, or iodine, or an inorganic or organic ion. Further, as the polar functional group, also $-OH$, $-SH$, $-CN$, an epoxy group, or the like is given.

Further, a polyisocyanate may be used in combination with a resin to cure the resin by crosslinking. Examples of the polyisocyanate include toluene diisocyanates and an adduct of these, alkylene diisocyanates and an adduct of these, and the like.

As the electrically conductive particles, fine particles containing carbon as a main component, such as carbon black, may be used. As the carbon black, for example, Asahi #15 or #15HS produced by Asahi Carbon Co., Ltd., or the like may be used. Further, also hybrid carbon in which carbon is adhered to the surface of a silica particle may be used.

As the lubricant, for example, an ester of a monobasic fatty acid having 10 to 24 carbon atoms and any one of monovalent to hexavalent alcohols having 2 to 12 carbon atoms, a mixed ester of these, a difatty acid ester, or a trifatty acid ester may be used as appropriate. Specific examples of the lubricant include lauric acid, myristic acid, palmitic acid, stearic acid, behenic acid, oleic acid, linoleic acid, linolenic acid, elaidic acid, butyl stearate, pentyl stearate, heptyl stearate, octyl stearate, isooctyl stearate, octyl myristate, and the like.

In a case where the base layer 12 further contains a lubricant, the contained amount of the lubricant is preferably not less than 1 part by mass and not more than 1.5 parts by mass relative to 100 parts by mass of the total amount of the carbon particle powder and the metal-containing particle powder. If the contained amount of the lubricant is less than 1 part by mass, the recording surface 13S is too hard, and the maximum indentation depth h may be outside the range of $85 \leq h \leq 140$. On the other hand, if the contained amount of the lubricant is more than 1.5 parts by mass, the recording surface 13S is too soft, and the maximum indentation depth h may be outside the range of $85 \leq h \leq 140$.

As the abrasive, for example, α-alumina with an α-conversion rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, and acicular α-iron oxide in which the source material of magnetic iron oxide is subjected to dehydration and annealing treatment, a material in which these materials are surface-treated with aluminum and/or silica as necessary, and the like are used singly or in combination.

In a case where the base layer 12 further contains an abrasive, the contained amount of the abrasive is preferably not less than 2 parts by mass and not more than 4 parts by mass relative to 100 parts by mass of the total amount of the carbon particle powder and the metal-containing particle powder. If the contained amount of the abrasive is less than 2 parts by mass, the recording surface 13S is too soft, and the maximum indentation depth h may be outside the range of $85 \leq h \leq 140$. On the other hand, if the contained amount of the abrasive is more than 4 parts by mass, the recording surface 13S is too hard, and the maximum indentation depth h may be outside the range of $85 \leq h \leq 140$.

(Recording Layer)

The recording layer 13 is, for example, a perpendicular recording layer on which short wavelength recording or ultrashort wave-exceeding recording can be performed. The recording layer 13 is a magnetic layer having magnetic anisotropy in the thickness direction of the recording layer 13. That is, the magnetization easy axis of the recording layer 13 is in the thickness direction of the recording layer 13. The average thickness of the recording layer 13 is preferably not less than 30 nm and not more than 100 nm, and more preferably not less than 50 nm and not more than 70 nm. Here, the average thickness of the recording layer 13 is found in a similar manner to the method for finding the average thickness of the base layer 12 described above.

The recording layer 13 is, for example, a magnetic layer containing magnetic powder and a binder. The recording layer 13 may further contain various additives such as electrically conductive particles, a lubricant, an abrasive, a hardener, and an antirust, as necessary.

The magnetic powder is cubic ferrite magnetic powder. In the present specification, magnetic powder composed of cubic ferrite magnetic particles is referred to as cubic ferrite magnetic powder. In order to improve the recording density of the magnetic recording medium, the magnetic recording medium preferably has a high S/N ratio. In general, in view of increasing the coercive force Hc in order to suppress recording demagnetization and self-demagnetization on the occasion when short wavelength recording is performed and suppressing noise, it is preferable that the particle size of the magnetic powder be designed to be as small as possible. In particular, in a perpendicularly oriented film, there is a tendency that higher power is obtained in a case where the coercive force Hc is higher, due to the effect of the demagnetic field. Furthermore, increasing the coercive force provides also excellent thermal stability on the occasion of making finer particles. Therefore, as a next-generation magnetic recording medium, one having a high coercive force Hc is preferable. In view of this point, cubic ferrite magnetic powder, which is highly likely to exhibit a higher coercive force Hc than hexagonal barium ferrite magnetic powder, is used in this one embodiment.

The cubic ferrite magnetic powder has a cubic form or an almost cubic form. Here, "the cubic ferrite magnetic powder is in an almost cubic form" refers to a rectangular parallelepiped form in which the average plate-like form ratio of the cubic ferrite magnetic powder (the average aspect ratio (the average plate diameter $L_{AM}$/the average plate thickness $L_{BM}$)) is not less than 0.75 and not more than 1.25. The cubic ferrite magnetic powder has a small unit lattice size, and is therefore advantageous from the viewpoint of making ultrafine particles in the future.

The cubic ferrite magnetic powder is dispersed in the recording layer 13. The magnetization easy axis of the cubic ferrite magnetic powder is in the thickness direction of the recording layer 13, or is in almost the thickness direction of the recording layer 13. That is, the cubic ferrite magnetic powder is dispersed in the recording layer 13 such that its square plane is perpendicular or almost perpendicular to the thickness direction of the recording layer 13. In cubic ferrite magnetic powder of a cubic form or an almost cubic form, the contact area between particles in the thickness direction of the medium can be reduced, and the cohesion of particles can be suppressed, as compared to barium ferrite magnetic powder of a hexagonal plate-like form. That is, the dispersibility of magnetic powder can be enhanced.

It is preferable that the square plane of the cubic ferrite magnetic powder be exposed from the surface of the recording layer 13. Performing short wavelength recording on the square plane with a magnetic head is advantageous from the viewpoint of high-density recording, as compared to a case where short wavelength recording is performed on the hexagonal plane of barium ferrite magnetic powder of a hexagonal plate-like form having the same volume. From the viewpoint of high-density recording, it is preferable that square planes of the cubic ferrite magnetic powder be laid over the surface of the recording layer 13.

The cubic ferrite magnetic particle is what is called a spinel ferrimagnetic particle. The cubic ferrite magnetic particle is a particle of an iron oxide containing cubic ferrite as the main phase. The cubic ferrite contains one or more selected from the group consisting of Co, Ni, Mn, Al, Cu, and Zn. It is preferable that the cubic ferrite contain at least Co and further contain, in addition to Co, one or more selected from the group consisting of Ni, Mn, Al, Cu, and Zn. More specifically, for example, the cubic ferrite has an average composition represented by the general formula of $MFe_2O_4$. Here, M is one or more metals selected from the group consisting of Co, Ni, Mn, Al, Cu, and Zn. M is preferably a combination of Co and one or more metals selected from the group consisting of Ni, Mn, Al, Cu, and Zn.

The average plate diameter (the average particle size) of the cubic ferrite magnetic powder is preferably 14 nm or less, and more preferably not less than 10 nm and not more than 14 nm. If the average plate diameter is more than 14 nm, the exposed area of the particle on the medium surface is large, and the S/N ratio may be reduced. On the other hand, if the average plate diameter is less than 10 nm, the production of the cubic ferrite magnetic powder may be difficult.

It is preferable that the average plate-like form ratio of the cubic ferrite magnetic powder (the average aspect ratio (the average plate diameter $L_{AM}$/the average plate thickness $L_{BM}$)) be not less than 0.75 and not more than 1.25. If the average plate-like form ratio is outside this numerical range, the form of the cubic ferrite magnetic powder is not a cubic form or an almost cubic form, and therefore cohesion may occur and short wavelength recording may be difficult.

The binder, the electrically conductive particles, the lubricant, and the abrasive are similar to those of the base layer 12 described above.

The recording layer 13 may further contain, as nonmagnetic reinforcing particles, aluminum oxide (α, β, or γ alumina), chromium oxide, silicon oxide, diamond, garnet, emery, boron nitride, titanium carbide, silicon carbide, titanium carbide, titanium oxide (titanium oxide of a rutile type or an anatase type), or the like.

(Back Coat Layer)

The back coat layer 14 contains a binder, inorganic particles, and a lubricant. The back coat layer 14 may contain various additives such as a hardener and an antistatic agent, as necessary. The binder, the inorganic particles, and the lubricant are similar to those of the base layer 12 described above.

2 Method for Producing Magnetic Recording Medium (Adjustment Process of Coating Materials)

First, nonmagnetic powder, a binder, etc. are kneaded and dispersed in a solvent to prepare a coating material for base layer formation. Next, magnetic powder, a binder, etc. are kneaded and dispersed in a solvent to prepare a coating material for recording layer formation. Next, a binder, inorganic particles, a lubricant, etc. are kneaded and dispersed in a solvent to prepare a coating material for back coat layer formation. The following solvents, dispersion apparatuses, and kneading apparatuses may be used for the preparation of the coating material for base layer formation, the coating material for recording layer formation, and the coating material for back coat layer formation, for example.

Examples of the solvent used for the coating material preparation described above include ketone-based solvents such as acetone, methyl ethyl ketone, methyl isobutyl ketone, and cyclohexanone, alcohol-based solvents such as methanol, ethanol, and propanol, ester-based solvents such as methyl acetate, ethyl acetate, butyl acetate, propyl acetate, ethyl lactate, and ethylene glycol acetate, ether-based solvents such as diethylene glycol dimethyl ether, 2-ethoxyethanol, tetrahydrofuran, and dioxane, aromatic hydrocarbon-based solvents such as benzene, toluene, and xylene, halogenated hydrocarbon-based solvents such as methylene chloride, ethylene chloride, carbon tetrachloride, chloroform, and chlorobenzene, and the like. These may be used singly, or may be mixed for use as appropriate.

As the kneading apparatus used for the coating material preparation described above, for example, kneading apparatuses such as a continuous twin-screw kneader, a continuous twin-screw kneader capable of performing dilution in multiple steps, a kneader, a pressurizing kneader, and a roll kneader may be used, but the kneading apparatus is not particularly limited to these apparatuses. Further, as the dispersion apparatus used for the coating material preparation described above, for example, dispersion apparatuses such as a roll mill, a ball mill, a horizontal sand mill, a vertical sand mill, a spike mill, a pin mill, a tower mill, a pearl mill (e.g., "DCP mill" manufactured by Maschinenfabrik Gustav Eirich GmbH & Co KG, etc.), a homogenizer, and an ultrasonic disperser may be used, but the dispersion apparatus is not particularly limited to these apparatuses.

(Formation Process of Base Layer)

Next, the coating material for base layer formation is applied onto one major surface of the nonmagnetic support body 11 and is dried, and thereby the base layer 12 is formed on the one major surface of the nonmagnetic support body 11.

(Formation Process of Recording Layer)

Next, the coating material for recording layer formation is applied onto the base layer 12 and is dried, and thereby the recording layer 13 is formed on the base layer 12. Here, it is preferable that, during the drying, the cubic ferrite magnetic powder contained in the magnetic powder be provided with a magnetic field orientation, and thereby the magnetization easy axis of the cubic ferrite magnetic powder be directed to the thickness direction of the recording layer 13 or directed to almost the thickness direction of the recording layer 13.

(Formation Process of Back Coat Layer)

Next, the coating material for back coat layer formation is applied onto the other major surface of the nonmagnetic support body 11 and is dried, and thereby the back coat layer 14 is formed on the other major surface of the nonmagnetic support body 11. Thereby, a wide-width magnetic recording medium is obtained.

(Process of Calender Treatment and Cutting)

Next, the obtained wide-width magnetic recording medium is rewound around a large-diameter core, and hardening treatment is performed. Next, calender treatment is performed on the wide-width magnetic recording medium, and then the workpiece is cut to a prescribed width. Thereby, a magnetic recording medium of an objective is obtained. Here, the process of forming the back coat layer 14 may be performed after calender treatment.

3 Effects

In the magnetic recording medium according to an embodiment of the present technology, the maximum indentation depth h of the recording surface 13S measured with a nanoindenter is 85≤h≤140. Further, the ratio d of the permanent strain to the elastic recovery (permanent strain/elastic recovery) of the recording surface 13S measured with a nanoindenter is 0.95≤d≤1.25. Thereby, running durability in high humidity environments can be improved.

4 Modification Examples

Although in the one embodiment described above a case where the magnetic recording medium is a perpendicular magnetic recording medium is descried as an example, the magnetic recording medium may be a horizontal magnetic recording medium.

Although in the one embodiment described above an example in which cubic ferrite magnetic powder is used as the magnetic powder contained in the recording layer is described, the magnetic powder is not limited to this example, and magnetic powders commonly used in perpendicular magnetic recording media or horizontal magnetic recording media may be used. Specific examples of the magnetic powder include an Fe-based metal powder and an Fe—Co-based metal powder, barium ferrite, iron carbide, iron oxide, and the like. Here, a metal compound of, as a secondary element, Co, Ni, Cr, Mn, Mg, Ca, Ba, Sr, Zn, Ti, Mo, Ag, Cu, Na, K, Li, Al, Si, Ge, Ga, Y, Nd, La, Ce, Zr, or the like may coexist.

The formation process of the base layer 12 and the recording layer 13 is not limited to the examples described above. For example, the base layer 12 and the recording layer 13 may be formed on one major surface of the nonmagnetic support body 11 also by applying a coating material for base layer formation onto the one major surface of the nonmagnetic support body 11 to form a coating film, further applying a coating material for recording layer formation onto the coating film in the wet state to form a coating film, and then drying both coating films.

EXAMPLES

Hereinafter, the present technology is specifically described using Examples, but the present technology is not limited to these Examples.

Examples 1 to 21 and Comparative Examples 1 to 9

(Preparation Process of Coating Material for Recording Layer Formation)

A coating material for recording layer formation was prepared in the following manner. First, the following source materials were kneaded with an extruder to obtain a kneaded product. CoNi ferrite crystal magnetic powder: 100 parts by mass
  (form: almost cubic form; average plate diameter: 11 nm; average plate-like form ratio: 0.95)
  Vinyl chloride-based resin (30 mass % in a cyclohexanone solution): 55.6 parts by mass
  (degree of polymerization: 300; Mn: 10,000; containing, as polar groups, $OSO_3K$: 0.07 mmol/g and a secondary OH: 0.3 mmol/g)
  Aluminum oxide powder: 5 parts by mass
  ($\alpha$-$Al_2O_3$, average particle size: 0.2 μm)
  Carbon black: 2 parts by mass
  (product name: SEAST TA, produced by Tokai Carbon Co., Ltd.)

Next, the kneaded product and the following source materials were introduced into a stirring tank equipped with a disperser, and preliminary mixing was performed. After that, sand mill mixing was further performed, and filter treatment was performed; thus, a coating material for recording layer formation was prepared.
  Vinyl chloride-based resin: 27.8 parts by mass
  (resin solution; resin content: 30 mass %, cyclohexanone: 70 mass %)
  Polyisocyanate: 4 parts by mass
  (product name: CORONATE L, produced by Nippon Polyurethane Industry Co., Ltd.)

Myristic acid: 2 parts by mass
n-Butyl stearate: 2 parts by mass
Methyl ethyl ketone: 121.3 parts by mass
Toluene: 121.3 parts by mass
Cyclohexanone: 60.7 parts by mass
(Preparation Process of Coating Material for Base Layer Formation)

Coating materials for base layer formation were prepared in the following manner. First, the following source materials were kneaded with an extruder to obtain a kneaded product. Acicular iron oxide powder: 21 to 56 parts by mass (as shown in Table 1, the contained amount was adjusted for each sample)
  (hematite ($\alpha$-$Fe_2O_3$), XG-250 or DB-65Y)
Vinyl chloride-based resin: 55.6 parts by mass
  (resin solution; resin content: 30 mass %, cyclohexanone: 70 mass %)
Carbon black: 44 to 79 parts by mass (as shown in Table 1, the contained amount was adjusted for each sample)
  (E410, produced by Cabot Corporation)
$\alpha$-Alumina (abrasive): 2.2 to 3.5 parts by mass (as shown in Table 2, the contained amount was adjusted for each sample)

Here, by adjusting the contained amounts of the carbon black and the acicular iron oxide powder in the ranges mentioned above, the volume ratio between the carbon black A and the acicular iron oxide powder B (A:B) was adjusted in the range of 68:32 to 91:9 as shown in Table 1. Further, the area ratio between the carbon black A and the acicular iron oxide powder B (A:B) was adjusted in the range of 62:38 to 82:18 as shown in Table 1.

Next, the kneaded product and the following source materials were introduced into a stirring tank equipped with a disperser, and preliminary mixing was performed. After that, sand mill mixing was further performed, and filter treatment was performed; thus, a coating material for base layer formation was prepared.
  Polyurethane-based resin UR8200 (produced by Toyobo Co., Ltd.): 18.5 parts by mass
  Polyisocyanate: 4 parts by mass
    (product name: CORONATE L, produced by Nippon Polyurethane Industry Co., Ltd.)
  Stearic acid (lubricant): 0.8 to 1.5 parts by mass (as shown in Table 2, the contained amount was adjusted for each sample)
  Methyl ethyl ketone: 108.2 parts by mass
  Toluene: 108.2 parts by mass
  Cyclohexanone: 18.5 parts by mass
(Preparation Process of Coating Material for Back Coat Layer Formation)

A coating material for back coat layer formation was prepared in the following manner. The following source materials were mixed in a stirring tank equipped with a disperser, and filter treatment was performed; thus, a coating material for back coat layer formation was prepared.
  Carbon black (product name: #80, produced by Asahi Company): 100 parts by mass
  Polyester polyurethane: 100 parts by mass
    (product name: N-2304, produced by Nippon Polyurethane Industry Co., Ltd.)
  Methyl ethyl ketone: 500 parts by mass
  Toluene: 400 parts by mass
  Cyclohexanone: 100 parts by mass
(Formation Process of Base Layer and Recording Layer)

Next, a base layer and a recording layer were formed in the following manner. First, the coating material for base layer formation was applied onto one major surface of a strip-shaped PEN film with a thickness of 6.2 μm that is a nonmagnetic support body and was dried, and thereby a base layer with an average thickness of 0.8 μm to 1.3 μm (see Table 2) was formed on the one major surface of the PEN film. Next, the coating material for recording layer formation was applied onto the base layer and was dried, and thereby a recording layer with an average thickness of 70 nm was formed on the base layer. Here, during the drying, the magnetic powder was provided with a magnetic field orientation.
(Formation Process of Back Coat Layer)

Next, the coating material for back coat layer formation was applied onto the other major surface of the PEN film and was dried, and thereby a back coat layer with an average thickness of 0.6 μm was formed on the other surface of the PEN film. Thereby, a wide-width magnetic tape was obtained.
(Process of Calender Treatment and Cutting)

Next, calender treatment with metal rolls was performed on the obtained wide-width magnetic tape, and the surface of the recording layer was smoothed. Next, the wide-width magnetic tape was cut to a width of ½ inches (12.65 mm), and a magnetic tape of an objective was obtained.
<Evaluation>

The following evaluation was performed for the magnetic tapes obtained in the above manner.
(Cross-Sectional TEM Image)

Figure 4:
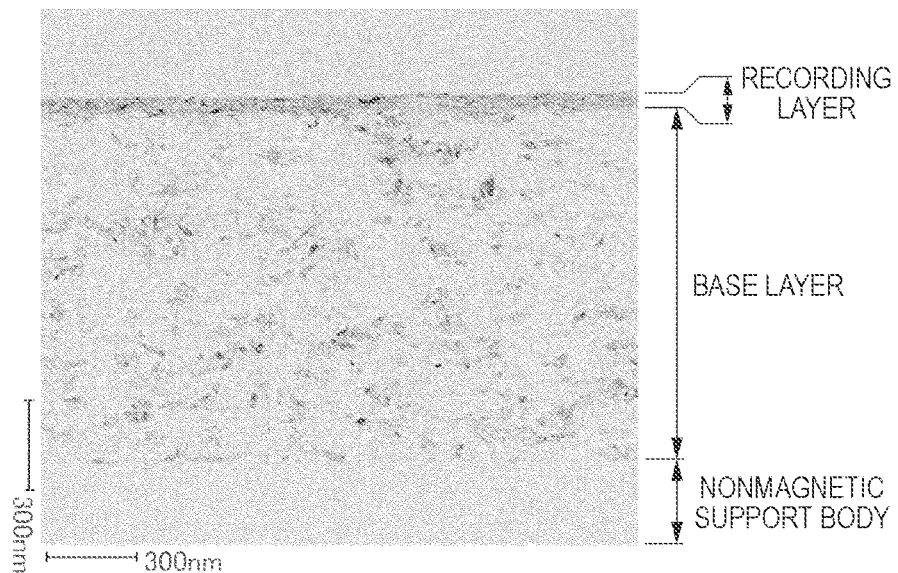
FIG. 4A is a cross-sectional TEM image of a magnetic tape of Example 16.
FIG. 4B is a cross-sectional TEM image of a magnetic tape of Comparative Example 3.
Figure 4:
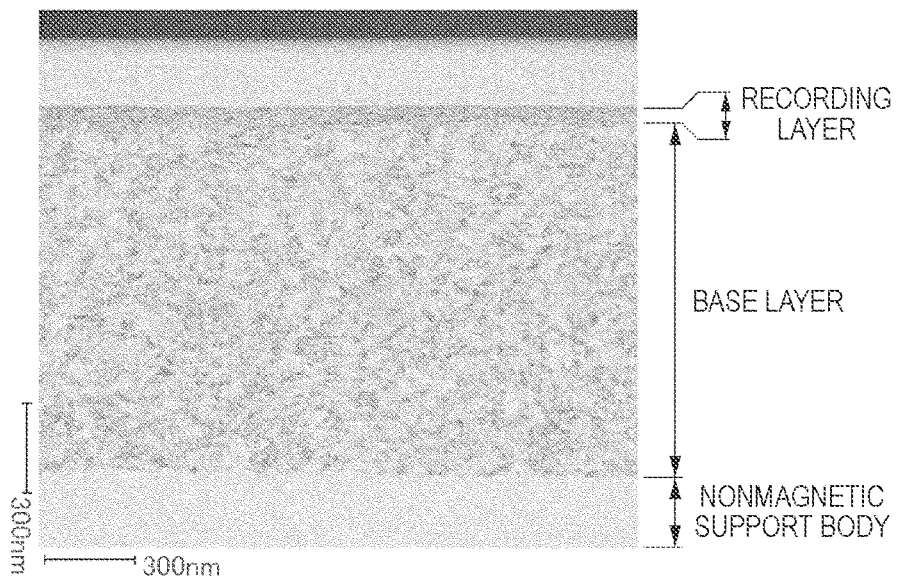

The magnetic tape of Example 16 and Comparative Example 3 was cut out perpendicularly to its recording surface, and a cross section of the test piece was observed with a TEM. The results are shown in FIG. 4A and FIG. 4B.
(Maximum Indentation Depth and Ratio d of Permanent Strain to Elastic Recovery)

The maximum indentation depth and the ratio d of the permanent strain to the elastic recovery (permanent strain/elastic recovery) were found by the nanoindenter measurement method. The results are shown in Table 2.

The measurement conditions are shown in the following.
[Indenter]
  Material: a triangular pyramidal diamond indenter (Berkovich)
  Dihedral angle: 142.3°
  Hardness measurement apparatus: Triboscope, manufactured by Hysitron, Inc./Shimadzu SPM9500J
[Evaluation Conditions]
  Measurement environment: 23° C./50% RH
  Load range: 0 to 200 μN (during measurement)
  Maximum load: 200 μN (setting)
  Load resolution: 0.01 μN
  Indentation direction: perpendicular to the recording surface
(Running Durability Test by Error Rate)

First, using a tape running system manufactured by Mountain Engineering, Inc. and using a magnetic head of a commercially available Linier Tape Open (LTO) drive, a recording signal was recorded on the ½ inch tape at a recording density equivalent to commercially available LTO-6. After that, the error rate of the magnetic tape after running for 600 hours from the initial time in an environment of 29° C. and an absolute humidity of 80% was measured. The results are shown in Table 2. Here, in Table 2, only the value of the exponent of 10 of the bit error rate is shown. Next, on the basis of the measured bit error rate, the running durability was assessed by the following criteria.

Double circle mark: the bit error rate is $10^{-5.9}$ or less
Circle mark: the bit error rate is more than $10^{-5.9}$ and less than $10^{-5.5}$
x-Mark: the bit error rate is $10^{-5.5}$ or more Here, the double circle mark means that the evaluation result is very good, the circle mark means that the evaluation result is good, and the x-mark means that the evaluation result is poor.

Table 1 and Table 2 show the configurations and evaluation results of the magnetic tapes of Examples 1 to 21 and Comparative Examples 1 to 9.

TABLE 1

|  | Carbon black | Hematite powder | Carbon black [mass ratio] | Hematite powder [mass ratio] | Carbon black [volume ratio] | Hematite powder [volume ratio] | Carbon black [area ratio] | Hematite [area ratio] |
|---|---|---|---|---|---|---|---|---|
| Comparative Example 1 | E410 produced by CABOT | XG-250 | 79 | 21 | 91 | 9 | 82 | 18 |
| Comparative Example 2 | E410 produced by CABOT | DB-65Y | 77 | 23 | 90 | 10 | 81 | 19 |
| Comparative Example 3 | E410 produced by CABOT | DB-65Y | 75 | 25 | 89 | 11 | 80 | 20 |
| Comparative Example 4 | E410 produced by CABOT | DB-65Y | 72 | 28 | 87 | 13 | 78 | 22 |
| Comparative Example 5 | E410 produced by CABOT | DB-65Y | 70 | 30 | 86 | 14 | 77 | 23 |
| Comparative Example 6 | E410 produced by CABOT | DB-65Y | 68 | 32 | 85 | 15 | 76 | 24 |
| Example 1 | E410 produced by CABOT | XG-250 | 65 | 35 | 83 | 17 | 74 | 26 |
| Example 2 | E410 produced by CABOT | XG-250 | 65 | 35 | 83 | 17 | 74 | 26 |
| Example 3 | E410 produced by CABOT | XG-250 | 65 | 35 | 83 | 17 | 74 | 26 |
| Example 4 | E410 produced by CABOT | XG-250 | 65 | 35 | 83 | 17 | 74 | 26 |
| Example 5 | E410 produced by CABOT | DB-65Y | 65 | 35 | 83 | 17 | 74 | 26 |
| Example 6 | E410 produced by CABOT | DB-65Y | 65 | 35 | 83 | 17 | 74 | 26 |
| Example 7 | E410 produced by CABOT | DB-65Y | 65 | 35 | 83 | 17 | 74 | 26 |
| Example 8 | E410 produced by CABOT | DB-65Y | 65 | 35 | 83 | 17 | 74 | 26 |
| Example 9 | E410 produced by CABOT | DB-65Y | 60 | 40 | 80 | 20 | 72 | 28 |
| Example 10 | E410 produced by CABOT | DB-65Y | 60 | 40 | 80 | 20 | 72 | 28 |
| Example 11 | E410 produced by CABOT | DB-65Y | 60 | 40 | 80 | 20 | 72 | 28 |
| Example 12 | E410 produced by CABOT | DB-65Y | 50 | 50 | 73 | 27 | 66 | 34 |
| Example 13 | E410 produced by CABOT | DB-65Y | 50 | 50 | 73 | 27 | 66 | 34 |
| Example 14 | E410 produced by CABOT | DB-65Y | 50 | 50 | 73 | 27 | 66 | 34 |
| Example 15 | E410 produced by CABOT | DB-65Y | 50 | 50 | 73 | 27 | 66 | 34 |
| Example 16 | E410 produced by CABOT | DB-65Y | 50 | 50 | 73 | 27 | 66 | 34 |
| Example 17 | E410 produced by CABOT | DB-65Y | 50 | 50 | 73 | 27 | 66 | 34 |
| Example 18 | E410 produced by CABOT | DB-65Y | 50 | 50 | 73 | 27 | 66 | 34 |
| Example 19 | E410 produced by CABOT | DB-65Y | 50 | 50 | 73 | 27 | 66 | 34 |
| Example 20 | E410 produced by CABOT | DB-65Y | 50 | 50 | 73 | 27 | 66 | 34 |
| Example 21 | E410 produced by CABOT | DB-65Y | 50 | 50 | 73 | 27 | 66 | 34 |
| Comparative Example 7 | E410 produced by CABOT | DB-65Y | 48 | 52 | 71 | 29 | 65 | 35 |
| Comparative Example 8 | E410 produced by CABOT | DB-65Y | 46 | 54 | 69 | 31 | 63 | 37 |
| Comparative Example 9 | E410 produced by CABOT | DB-65Y | 44 | 56 | 68 | 32 | 62 | 38 |

TABLE 2

|  | Thickness of base layer [μm] | Alumina [parts by mass] | Stearic acid [parts by mass] | Maximum indentation depth [nm] | Permanent strain/elastic recovery | Error rate | Running durability test |
|---|---|---|---|---|---|---|---|
| Comparative Example 1 | 1.1 | 3.5 | 1 | 158 | 0.63 | −5.2 | X |
| Comparative Example 2 | 1.2 | 2.2 | 1.3 | 156 | 1.15 | −5.1 | X |
| Comparative Example 3 | 1.2 | 3.5 | 1 | 139 | 0.66 | −5.2 | X |
| Comparative Example 4 | 1.2 | 2.3 | 1 | 150 | 1.29 | −5.5 | X |
| Comparative Example 5 | 1.2 | 2.3 | 1.3 | 145 | 1.20 | −5.3 | X |
| Comparative Example 6 | 1.2 | 2.3 | 1.3 | 125 | 1.30 | −5.5 | X |
| Example 1 | 0.8 | 2.3 | 0.8 | 105 | 1.20 | −5.7 | ○ |
| Example 2 | 1.3 | 2.3 | 2 | 138 | 1.18 | −5.7 | ○ |
| Example 3 | 0.8 | 2.3 | 1.1 | 115 | 1.23 | −5.7 | ○ |
| Example 4 | 1.3 | 2.3 | 1.5 | 138 | 1.05 | −5.7 | ○ |
| Example 5 | 1 | 2.3 | 1 | 115 | 1.15 | −6.1 | ◎ |
| Example 6 | 1.2 | 2.3 | 1 | 113 | 1.15 | −6.1 | ◎ |
| Example 7 | 1 | 2.3 | 1.3 | 108 | 1.15 | −6.2 | ◎ |
| Example 8 | 1.2 | 2.3 | 1.3 | 105 | 1.13 | −6.1 | ◎ |
| Example 9 | 1 | 2.3 | 1.2 | 107 | 1.08 | −6.2 | ◎ |
| Example 10 | 1.1 | 2.3 | 1.3 | 115 | 1.10 | −5.9 | ◎ |
| Example 11 | 1.2 | 2.3 | 1.5 | 112 | 1.00 | −6.2 | ◎ |
| Example 12 | 0.8 | 2.3 | 0.8 | 120 | 1.10 | −5.8 | ○ |
| Example 13 | 0.9 | 2.3 | 2 | 100 | 0.98 | −5.9 | ◎ |
| Example 14 | 1.3 | 2.3 | 1.1 | 88 | 1.15 | −6.1 | ◎ |
| Example 15 | 1.3 | 2.3 | 1.5 | 88 | 1.15 | −6.1 | ◎ |
| Example 16 | 1.15 | 2.3 | 1 | 105 | 0.98 | −6.2 | ◎ |
| Example 17 | 1.2 | 2.3 | 1.3 | 105 | 0.99 | −5.9 | ◎ |
| Example 18 | 1.3 | 2.3 | 1.5 | 105 | 1.00 | −5.8 | ○ |

TABLE 2-continued

|  | Thickness of base layer [μm] | Alumina [parts by mass] | Stearic acid [parts by mass] | Maximum indentation depth [nm] | Permanent strain/ elastic recovery | Error rate | Running durability test |
|---|---|---|---|---|---|---|---|
| Example 19 | 1 | 2.3 | 1.2 | 106 | 0.97 | −6.2 | ⊚ |
| Example 20 | 1.1 | 2.3 | 1.3 | 107 | 0.98 | −5.9 | ⊚ |
| Example 21 | 1.2 | 2.3 | 1.5 | 105 | 0.99 | −5.8 | ○ |
| Comparative Example 7 | 1.2 | 2.2 | 1.3 | 83 | 1.15 | −5.7 | ○ |
| Comparative Example 8 | 1.2 | 2.2 | 1.3 | 88 | 0.66 | −5.2 | × |
| Comparative Example 9 | 1.2 | 2.2 | 1.3 | 80 | 0.66 | −5.4 | × |

From Table 1 and Table 2, it can be seen that running durability in high humidity environments can be improved if the maximum indentation depth h of the recording surface measured with a nanoindenter is 85≤h≤140 and the ratio d of the permanent strain to the elastic recovery (permanent strain/elastic recovery) of the recording surface measured with a nanoindenter is 0.95≤d≤1.25.

Hereinabove, embodiments of the present technology and modification examples thereof, and Examples are specifically described; but the present technology is not limited to the embodiments and the modification examples thereof, and Examples described above, and various modifications based on the technical idea of the present technology are possible.

For example, the configurations, methods, processes, shapes and forms, materials, numerical values, etc. given in the embodiments and the modification examples thereof, and Examples described above are only examples, and configurations, methods, processes, shapes and forms, materials, numerical values, etc. different from those may be used, as necessary.

Further, the configurations, methods, processes, shapes and forms, materials, numerical values, etc. of the embodiments and the modification examples thereof, and Examples described above may be combined with each other without departing from the spirit of the present technology.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Additionally, the present technology may also be configured as below.

(1)
A magnetic recording medium including:
a support body;
a base layer containing carbon particle powder and metal-containing particle powder; and
a recording layer,
in which, in a recording surface, a maximum indentation depth h is 85≤h≤140, and a ratio d of a permanent strain to an elastic recovery (permanent strain/elastic recovery) is 0.95≤d≤1.25.

(2)
The magnetic recording medium according to (1),
in which a volume ratio between the carbon particle powder and the metal-containing particle powder (a volume of the carbon particle powder:a volume of the metal-containing particle powder) is 73:27 to 83:17.

(3)
The magnetic recording medium according to (1) or (2),
in which an area ratio between the carbon particle powder A and the metal-containing particle powder B (an area of the carbon particle powder:an area of the metal-containing particle powder) is 66:34 to 74:26.

(4)
The magnetic recording medium according to any one of (1) to (3),
in which the metal-containing particle powder is metal oxide particle powder.

(5)
The magnetic recording medium according to any one of (1) to (3),
in which the metal-containing particle powder is iron oxide particle powder.

(6)
The magnetic recording medium according to any one of (1) to (5),
in which the carbon particle powder is carbon black particle powder.

(7)
The magnetic recording medium according to any one of (1) to (6),
in which the base layer further contains a lubricant, and the contained amount of the lubricant is not less than 1 part by mass and not more than 1.5 parts by mass relative to 100 parts by mass of the total amount of the carbon particle powder and the metal-containing particle powder.

(8)
The magnetic recording medium according to any one of (1) to (7),
in which the base layer further contains an abrasive, and the contained amount of the abrasive is not less than 2 parts by mass and not more than 4 parts by mass relative to 100 parts by mass of the total amount of the carbon particle powder and the metal-containing particle powder.

REFERENCE SIGNS LIST 11 nonmagnetic support body
12 base layer
13 recording layer
13S recording surface
14 back coat layer

The invention claimed is:
1. A magnetic recording medium comprising:
a strip-shaped support body;
a base layer containing a binder, carbon particle powder and metal-containing particle powder; and a recording layer,
wherein in a recording surface, in a case that a maximum indentation depth and a ratio d of a permanent strain to an elastic recovery are measured by a nanoindenter having a dihedral angle of 142.3° and subject to a load that is continuously increased to a maximum load of 200 μN and then the load is removed, the maximum indentation depth h at the maximum load of 200 μN is 85 nm≤h≤140 nm, and the ratio d of the permanent strain to the elastic recovery (permanent strain/elastic recovery) is 0.95≤d≤1.23.

2. The magnetic recording medium according to claim 1, wherein a volume ratio between the carbon particle powder and the metal-containing particle powder (a volume of the carbon particle powder: a volume of the metal-containing particle powder) is 73:27 to 83:17.

3. The magnetic recording medium according to claim 1, wherein the metal-containing particle powder is metal oxide particle powder.

4. The magnetic recording medium according to claim 1, wherein the metal-containing particle powder is iron oxide particle powder.

5. The magnetic recording medium according to claim 1, wherein the carbon particle powder is carbon black particle powder.

6. The magnetic recording medium according to claim 1, wherein the base layer further contains a lubricant, and a contained amount of the lubricant is not less than 1 part by mass and not more than 1.5 parts by mass relative to 100 parts by mass of a total amount of the carbon particle powder and the metal-containing particle powder.

7. The magnetic recording medium according to claim 1, wherein the strip-shaped support body includes polyester.

8. The magnetic recording medium according to claim 1, wherein the binder of the base layer comprises at least one of polyurethane-based resin or vinyl chloride-based resin.

9. The magnetic recording medium according to claim 1, wherein the metal-containing particle powder includes $\alpha\text{-}Fe_2O_3$.

10. The magnetic recording medium according to claim 1, wherein the base layer further includes an abrasive, and a contained amount of the abrasive is not less than 2 parts by mass and not more than 4 parts by mass relative to 100 parts by mass of a total amount of the carbon particle powder and the metal-containing particle powder.

11. The magnetic recording medium according to claim 1, wherein an area ratio between the carbon particle powder and the metal-containing particle powder (an area of the carbon particle powder: an area of the metal-containing particle powder) is 66:34 to 74:26.

12. The magnetic recording medium according to claim 1, wherein the recording layer includes polyurethane-based resin or vinyl chloride-based resin.

13. The magnetic recording medium according to claim 1, wherein a thickness of the recording layer is 30 nm-100 nm.

14. The magnetic recording medium according to claim 1, wherein a thickness of the recording layer is 50 nm-70 nm.

15. The magnetic recording medium according to claim 1, wherein the recording layer includes polyurethane-based resin and vinyl chloride-based resin.

16. The magnetic recording medium according to claim 1, wherein the recording layer includes cubic ferrite magnetic powder.

17. The magnetic recording medium according to claim 1, wherein the recording layer includes aluminum oxide, chromium oxide, silicon oxide, diamond, garnet, emery, boron nitride, titanium carbide, silicon carbide, titanium carbide, or titanium oxide.

18. The magnetic recording medium according to claim 17, wherein aluminum oxide includes α, β, or γ alumina, and wherein titanium oxide includes titanium oxide of a rutile type or an anatase type.

19. The magnetic recording medium according to claim 1, further comprising a back coat layer.

20. The magnetic recording medium according to claim 1, wherein the maximum indentation depth h is 88≤h≤115 nm.

21. The magnetic recording medium according to claim 1, wherein the ratio d of the permanent strain to the elastic recovery (permanent strain/elastic recovery) is 0.97≤d≤1.15.

22. The magnetic recording medium according to claim 1, wherein the maximum indentation depth h is 88≤h≤138 nm, and the ratio d of the permanent strain to the elastic recovery (permanent strain/elastic recovery) is 0.97≤d≤1.23.

* * * * *